(12) United States Patent
Murphy

(10) Patent No.: US 6,660,123 B2
(45) Date of Patent: Dec. 9, 2003

(54) METHOD OF LAMINATING A DOCUMENT IN A PLASTIC FILM

(76) Inventor: Willis A. Murphy, 28 Hemlock Ter., Deep River, CT (US) 06417

( * ) Notice: Subject to any disclaimer, the term of this patent is extended or adjusted under 35 U.S.C. 154(b) by 120 days.

(21) Appl. No.: 10/047,399

(22) Filed: Jan. 16, 2002

(65) Prior Publication Data

US 2003/0131931 A1 Jul. 17, 2003

(51) Int. Cl.[7] .......................... B32B 31/28; B30B 15/34
(52) U.S. Cl. ................ 156/273.7; 156/275.7; 156/321
(58) Field of Search .............. 156/273.7, 275.7, 156/321, 379.6, 379.8, 583.1, 583.9, 303.1

(56) References Cited

U.S. PATENT DOCUMENTS

| | | | |
|---|---|---|---|
| 2,457,659 A | | 12/1948 | Graham et al. |
| 2,472,708 A | | 6/1949 | Jones |
| 3,598,684 A | | 8/1971 | Militana et al. |
| 3,959,567 A | | 5/1976 | Bradley |
| 4,158,587 A | * | 6/1979 | Keller et al. .................. 156/216 |
| 4,421,589 A | * | 12/1983 | Armini et al. ............... 156/382 |
| 4,617,439 A | | 10/1986 | Lespinats et al. |
| 4,878,765 A | * | 11/1989 | Watkins et al. .......... 156/272.2 |
| 5,107,087 A | | 4/1992 | Yamada et al. |
| 5,180,894 A | | 1/1993 | Quick et al. |
| 5,366,580 A | | 11/1994 | Czach |
| 5,400,460 A | * | 3/1995 | Roeker et al. ............ 156/273.3 |
| 5,433,804 A | * | 7/1995 | Nottingham et al. .......... 156/71 |
| 5,705,022 A | | 1/1998 | Lewis et al. |
| 5,718,356 A | | 2/1998 | Nottingham et al. |
| 5,728,257 A | * | 3/1998 | Lee .............................. 156/555 |
| 5,779,844 A | | 7/1998 | Lewis et al. |
| 5,798,395 A | | 8/1998 | Lauf et al. |
| 6,131,636 A | * | 10/2000 | Anderson et al. ............ 156/555 |
| 6,484,775 B2 | * | 11/2002 | Kubota ........................ 156/358 |

* cited by examiner

Primary Examiner—Jeff H. Aftergut
Assistant Examiner—Todd J. Kilkenny
(74) Attorney, Agent, or Firm—Cantor Colburn LLP

(57) ABSTRACT

A device embodying the invention comprises a pair of members presenting a lower base surface and a member presenting an upper parallel surface when in an operative position. A platen pad material, which converts microwave energy to heat, is provided on one of the surfaces. When in an operative position the two platens provide uniform pressure over the surfaces of a laminating pouch carrying a document. The device is placed in a domestic microwave oven and the oven is operated for a period of time dependent on the rated power of the oven, the size of the document and the energy conversion capability of the platen pad. The platen pad converts the microwave energy to heat energy while applying uniform pressure over the surfaces of the pouch. This produces liquefaction of the adhesive which bonds the film to the document. The device is then removed from the microwave oven, permitted to cool, the lamination removed, and trimmed as may be necessary.

4 Claims, 3 Drawing Sheets

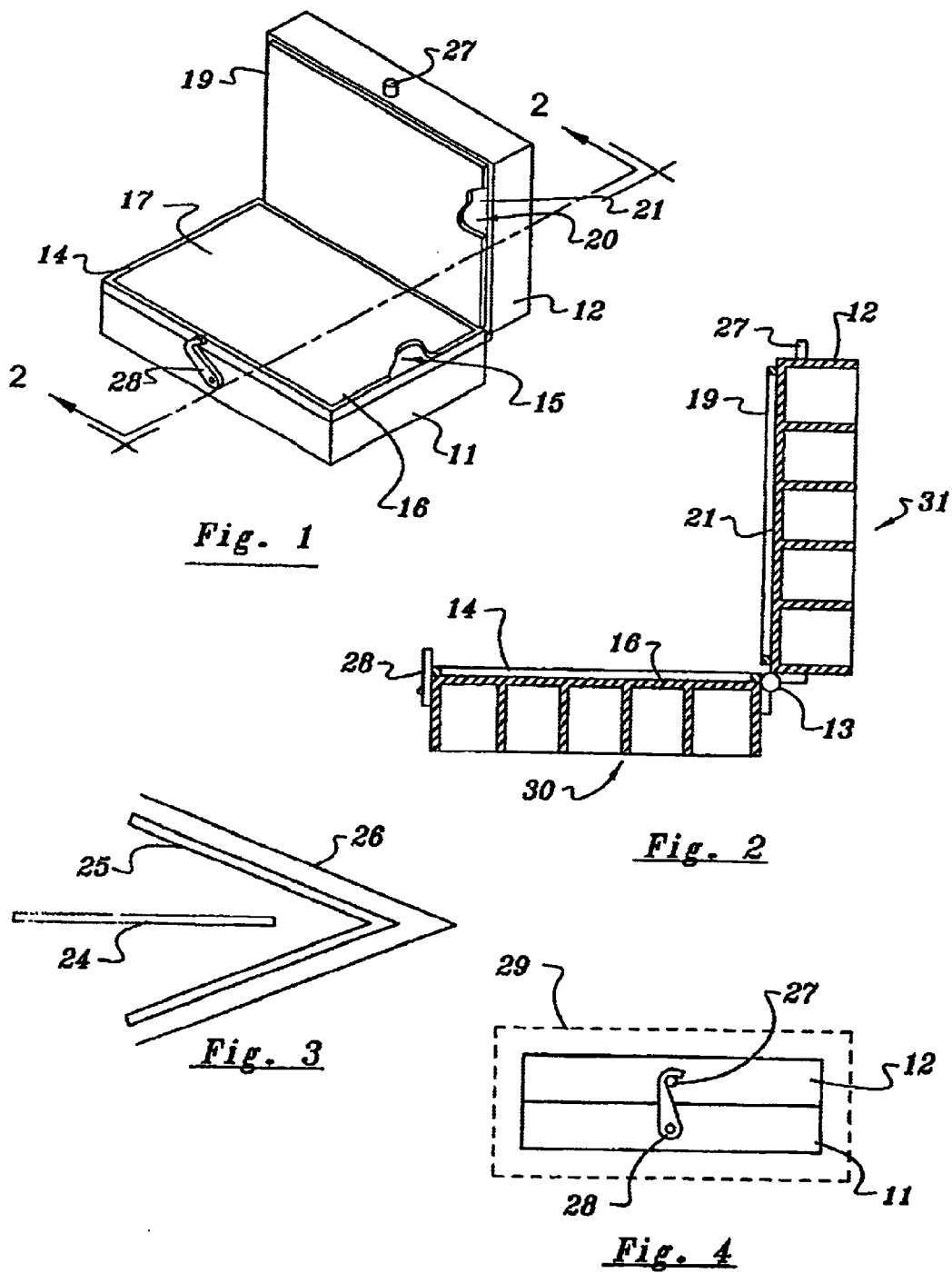

METHOD OF LAMINATING A DOCUMENT IN A PLASTIC FILM

FIELD OF THE INVENTION

This invention relates to laminating of documents for preservation and protection and a device for and method of for laminating

BACKGROUND OF THE INVENTION

Many documents are laminated between sheets of clear plastic for purposes of protection and preservation as well as aesthetic purposes. Laminating machines are available in many sizes for the purpose of laminating large poster size documents or displays to small identification size cards such as social security cards.

These laminating machine at the large end include what is referred to as roll laminators where the object to be laminated is subjected to heat and pressure as the object is passed between pairs of rollers between upper and lower layers of laminating film drawn from supply rolls. For smaller sizes, a pouch laminator is often utilized. Pouch laminators utilize a pouch (folded over sheet of adhesive resin coated polyester) to receive a document to be laminated. The pouches are constructed of a layer of polyester base film and a layer of resin bonded together.

During the lamination process when heat is applied, the adhesive resin is softened or liquefied. Once liquefied, and subjected to pressure, the adhesive resin spreads across the surface of the substrate and into the pores of the substrate. The resin then hardens as it cools, creating a permanent bond between the polyester film and the substrate.

It is important that the application of heat and pressure be uniform in order to achieve an acceptable lamination. This is and has been accomplished by simultaneously heating the laminating film and applying uniform pressure across the pouch and substrate by means of pressure rollers.

Simple or non-complicated personal devices for laminating a document for the purposes of protection, preservation and enhancement of display are not presently readily available to the individual. A laminating machine is not a household item. Laminating services are generally available, but to obtain such services one must travel to a location offering the services. This may be an inconvenience when one wants to have only one document laminated occasionally.

Accordingly, the present invention provides a new and improved device, which permits an individual who has a microwave oven to laminate a document at his or her convenience. As used herein in regard to laminating the term document refers to any flat substrate such as a letter, photograph, permit, license, etc which an individual wishes to protect, preserve or enhance to appearance thereof for purpose of display.

The invention provides a small compact device, which converts microwave energy to heat energy and provides uniform pressure to a document in a laminating pouch to effect lamination of the document.

An object of this invention is to provide a new and improved device of simple construction, which enables an individual to laminate at home.

Another object of this invention is to provide a new and improved method of laminating a document using a domestic microwave oven.

Another object of this invention is to provide a new and improved device for laminating documents in a domestic microwave oven which has no moving parts and which may be conveniently stored when not in use.

SUMMARY OF THE INVENTION

Briefly stated, a device embodying the invention, in one form thereof, comprises a member having having a lower base surface and a member hinged thereto having an upper parallel surface when in an operative position. A platen pad, which converts microwave energy to heat energy, is provided on a surface. A yieldable elastomeric pad is provided on the other surface. When in an operative position the platen pad and the elastomeric pad provide uniform pressure over the surfaces of a laminating pouch carrying a document in a laminating pouch. The device is placed in a domestic microwave oven and the oven is operated for a period of time dependent on the rated power of the oven and the size of the document. The platen pad converts the microwave energy to heat while uniform pressure is applied over the surfaces of the pouch. The device is then removed from the microwave oven, permitted to cool, the lamination removed from the carrier, and trimmed as may be necessary.

As a method the invention comprises the steps of providing the at least one platen, positioning the pouch with document therein between the at least one platen and the opposing yieldable pad, exerting uniform pressure on the surfaces of the pouch and subjecting the platens to microwave energy for a time sufficient to laminate the document in the pouch, allowing the platens to cool, and removing the resulting lamination from between the platens.

The invention is particularly pointed out and distinctly claimed in the concluding portion of this specification. The invention, however, together with further objects and advantages thereof, may be best appreciated by reference to the following detailed description taken in conjunction with the drawings

BRIEF DESCRIPTION OF THE DRAWINGS

FIG. 1 is a view in perspective of a device embodying the invention;

FIG. 2 is a sectional view of a portion of FIG. 1 shown in the plane of lines 2—2 of FIG. 1

FIG. 3 is a side elevation of the device of FIG. 1 exemplified in a position to receive material to be laminated (material shown enlarged);

FIG. 4 is a front elevation of the device of FIG. 1 showing the top and bottom members closed and clamped together to exert pressure on material to be laminated.

DETAILED DESCRIPTION OF PREFERRED EMBODIMENTS OF THE INVENTION

Figure 5:
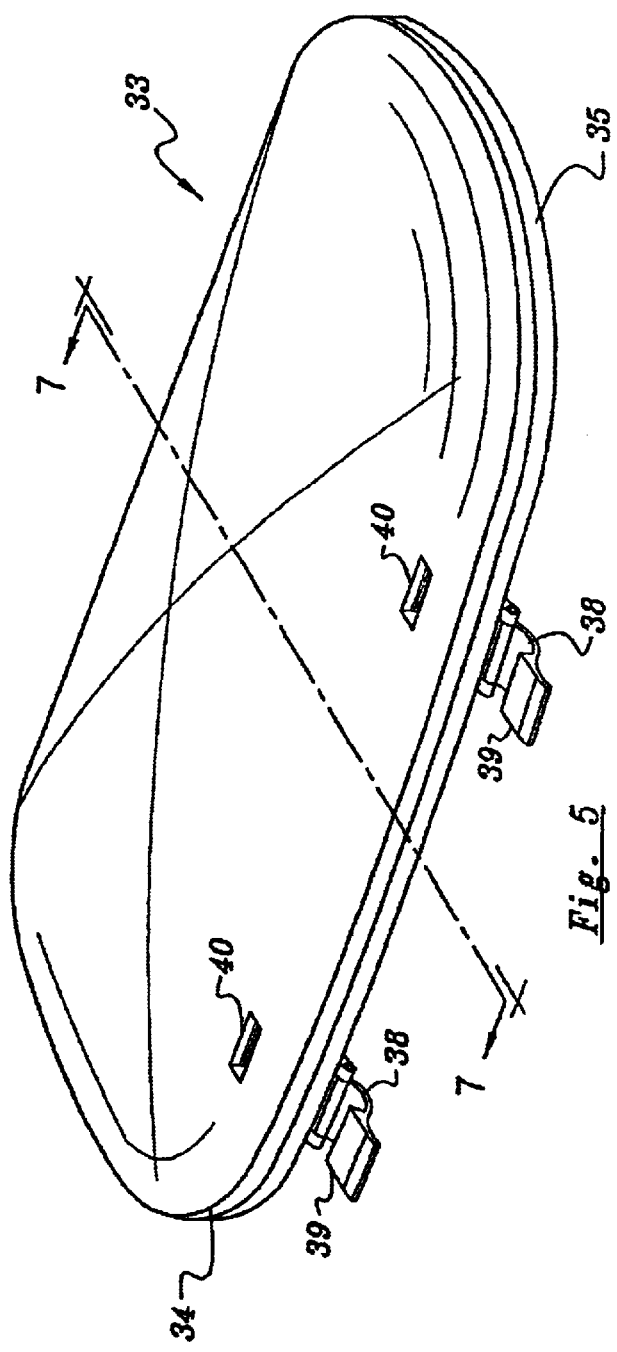
FIG. 5 is a view in perspective of another device embodying the invention.

A laminating device 10 is shown in FIG. 1, which comprises a lower base member 11 and an upper member 12 hinged thereto at 13 as shown in FIG. 2. Base member 11 has a peripheral rectangular lip 14 defining a cavity or recess 15 above a planar surface 16. Cavity 15 receives therein a platen pad 17 of a nonconductive material such as silicone rubber. Platen pad 17, in one form is a pad of silicon rubber, preferably about three thirty-seconds to one quarter inch (3/32" to 0.125") thick. Platen 17 has uniformly dispersed therein microwave absorbing electrically conductive material in granular, fibrous, filamentary or powder form. Platen pad 17 is in essence a microwave energy to heat energy transducer and is hereinafter further described.

Upper member 12 also has a rectangular peripheral lip 19 defining a cavity or recess 20 above a planer surface 21. Received in recess 20 is a yieldable elastomeric pad 22, which is of a thickness to extend slightly above lip 19, about one thirty-second inch (1/32"). When upper member 12 is closed on base member 11 the surfaces of lips 14 and 19 are flush with each other. Hinge 13 is positioned with respect to base member 11 and upper member 12 to achieve this relation.

Platen pad 17 is essentially flush with the upper edge of lip 14, and pad 22 extends a slight distance above the edge of lip 19 of upper member 12. When members 11 and 12 are closed to an operative position and latched, as shown in FIG. 4, elastomeric pad 22 is compressed, the edges of lips 14 and 19 are in contact and uniform pressure is applied over the surfaces of the laminating carrier and hence to the laminating pouch and included document.

Reference is now made to FIG. 3. A document 24 is shown in relation to a laminating pouch 25 and a laminating carrier 26 (not to scale). Pouch 25 has a coating of a heat activated resin on each of its facing surfaces 25a and 25b. Document 24 is inserted into pouch 25, The carrier 26 is used to prevent any liquefied adhesive from pouch 25 from depositing on platen pad 17 or pad 22. The carrier 26 with pouch 25 therein containing document 24 is placed on platen pad 17. Upper member 12 is closed on base member 11 and latched thereto. A stud or pin 27 extends from the front of upper member 12. A latching member 28 is pivotally mounted to the front of base member 11 and is pivotal to engage pin 27 as shown in FIG. 4. FIG. 4 illustrates a latched laminating device 10 in a domestic microwave oven, exemplified by broken line 29.

When upper 12 member is closed on base member 11 the carrier 26 with its contents is subjected to pressure by platen pad 17 and pad 22. Pad 22 yields to accept the thickness of the carrier 26 and its contents. The microwave oven is then operated for a predetermined period of time dependent on its power rating. Then the device 10 is removed from the oven, opened and the lamination allowed to cool for a short time, on the order of one minute. The edges of the resulting lamination are then trimmed if necessary FIG. 2 exemplifies the structure of a prototype device 10 without platen pad 17 and pad 22 therein. The device is formed of a non-conductive plastic material with the upper 12 and lower 11 members sufficiently rigid to accept the clamping pressure when the device is clamped in an operative condition. Both of the members 11 and 12 have a honeycomb type structure 30 and 31, respectively, integral with and extending from the surfaces 16 and 20, as hereinafter exemplified.

Figure 6:
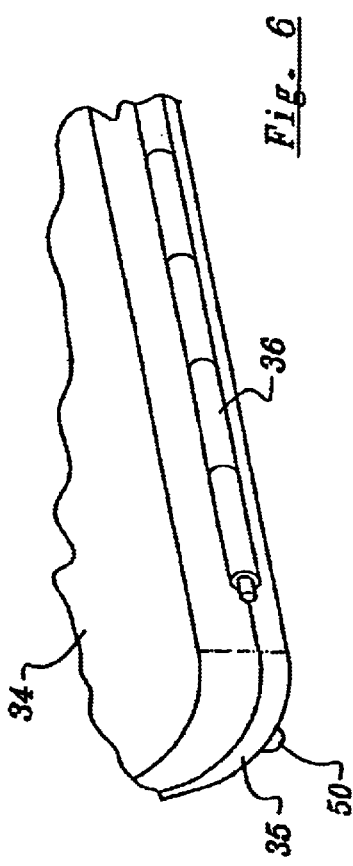
FIG. 6 is a perspective view of the device of FIG. 5 seen predominantly from the rear thereof

Another embodiment of the invention is shown in FIGS. 5–8. FIG. 5 illustrates a laminating device 33, in perspective, which comprises an upper housing member 34 hinged to a lower housing member 35 by a piano-type hinge 36, as seen in FIG. 6. The upper and lower members 34 and 35 are latched together by clamping members 38 hinged on lower member 32 and having jaws 39 which engage into latching recesses 40 defined in upper member 34. When closed and latched the upper and lower members will exert pressure on an object to be laminated as exemplified in FIG. 4 and hereinafter described.

Figure 7:
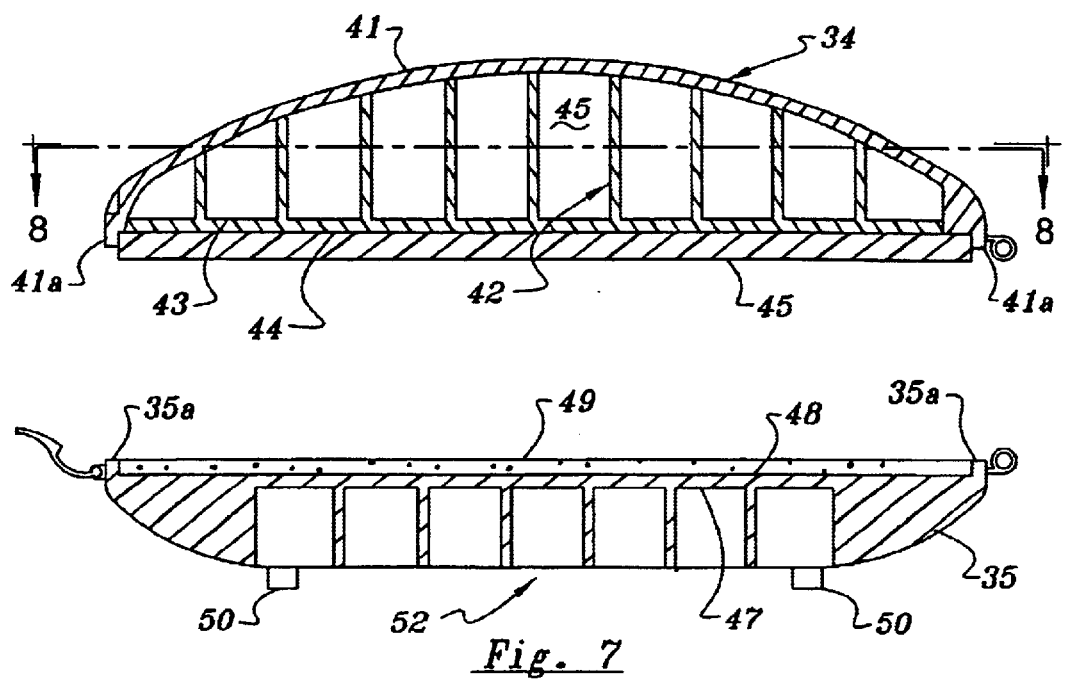
FIG. 7 is a sectional view, seen in the plane of lines 7—7 of FIG. 5, with the top and bottom members vertically separated.
Figure 8:
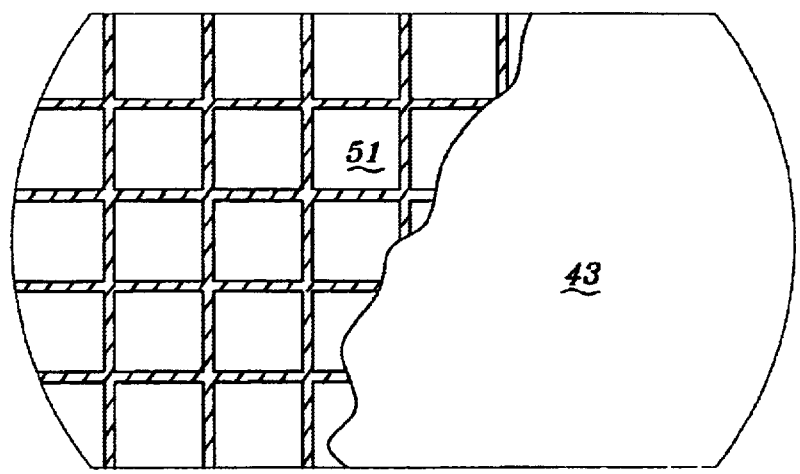
FIG. 8 is a sectional view of the upper member of FIG. 7 seen in the plane of lines 8—8 of FIG. 7.

FIG. 7 is a sectional view seen in the plane of lines 7—7 of FIG. 5 with the members 34 and 35 unhinged and spaced apart. Upper member 34 comprises an outer casing 41, which receives an insert 42. Insert 42 comprises a molded structure including a member 43 providing an upper plana surface 44, which is received above the lower edges 41a of casing 41, which are lips defining a recess for an elastomeric pad 45. This defines a recess or seat for elastomeric pad 45 against member 43. A honeycomb structure 46, as hereinafter exemplified in FIG. 8, is molded integral with insert 42 to impart rigidity thereto. The honeycomb structure 46 may be adhered into casing 41 or may be a slight press fit. The insert 42 imparts rigidity to the upper member 41 to enable it to exert pressure on an object to be laminated.

Lower Member 35 is molded with an upper member 47 defining a lower planar surface 48 bounded by a peripheral lip 35a which defines a seat or recess for a platen pad 49 on planar surface 48. Member 35 also has lower supporting feet 50.

When members 34 and 35 are closed and clamped in an operative, surfaces 44 and 48 are parallep, lips 41a and 35a are in contact and pad 45 is compressed into the recess defined by surface 44 and lip 41a.

FIG. 8 is a view seen in the plane of lines 8—8 of FIG. 7 and exemplifies the honey comb construction of insert 42. The honeycomb comprises a plurality of integrally connected upstanding walls extending from member 43 defining a plurality of square or rectangular walled pockets 51, only one referenced.

Referring back to FIG. 7, a platen pad 49 is received in a recess in member 35 defined by surface 48 and peripheral lip 35a thereabout. The upper surface of platen pad 49 is in the same plane as the edge of the lip 35a. Member 35 is molded with an integral honey comb structure 52 beneath surface 48, which is the same as exemplified in FIG. 8.

The resilient pad 45 extends beyond the edge of lip 41a bounding surface 43. Thus when upper member 34 is closed on lower member 35 and clamped thereto by latches 38; the platen pad will exert pressure on resilient pad and the laminating carrier, pouch and document therein. Pad 45 will be compressed to the edge of lip 41a. At this point it will in essence bottom. This will provide a uniform pressure over the surface of the material to be laminated.

The hinged members 11 and 12, and 34 and 35 may be molded of a resin, such as polycarbonate. A preferred resin is sold under the Trademark LEXAN by the General Electric Company and designated as 241. Another suitable plastic is glass reinforced nylon.

Platen pads may be obtained from Ames Rubber Corporation of Hamburg, N.J. and the CRI-SIL Division of Immix Technologies, LLC of Biddeford, Me., among others The platen pads preferably have a Shore A hardness of at least forty (40). The platen pads are formed of silicone rubber with the conductive particles uniformly distributed therein.

The elastomeric pads may be of adhesive backed foamed rubber, which will adhere to the planar surfaces of one of the hinged members. The elastomeric pads are selected to yield under pressure of the platen pad when the device is closed and latched, yet react with pressure against the laminating pouch. A suitable elastomeric pad is available from distributors of Groendyk Manufacturing Co., Inc. of Buchanan, Va. identified by No. 17204. This is closed cell foam rubber, rated medium soft, with an acrylic adhesive backing.

The platen pads and the time of heating are chosen to reach a temperature sufficient to melt the adhesive resin of the laminating pouch. A preferred laminating pouch is one marketed by USI, Inc. of Madison, Conn. under the trademark DIGISEAL. The resin of this pouch will melt and fuse to a document to be laminated at eighty-five degrees Fahrenheit (185° F.). The time of operation of the oven may vary depending on the melting point of the resin of the laminating pouch.

The time of operation of the microwave oven for lamination will depend on the power rating of the oven and the size of the document to be laminated. For example, in a one thousand watt microwave oven a typical three and one-half by two and one-half inch card will require twelve seconds. A four by six inch document in the same oven will require fourteen seconds. The time may also vary dependent on the age of the microwave generator of the oven. Trial may be required for the necessary time of operation of the oven dependent on individual ovens.

While, apparatus embodying the invention has been disclosed with the elastomeric pad on the upper of the two hinged members and the platen pad on the lower of the members, it will be apparent that the positions of the pads may be reversed. If the platen pad is placed on the upper planar surface, it will be adhered thereto.

While the two embodiments of the invention disclosed have been shown as having hinged upper and lower members, the two members may not be attached and have clamping means on opposite sides thereof to provide uniform pressure on a laminating assembly of a document and laminating pouch.

It may thus be seen that the objects of the invention set forth above as well as those made apparent are efficiently attained. While preferred embodiments of the invention have been set forth for purposes of disclosure, modifications to the disclosed embodiments as well as other embodiments of the invention may occur to those skilled in the art. Accordingly, the appended claims are intended to cover all modifications to the disclosed embodiments of the invention as well as other embodiments thereof which do not depart from the spirit and scope of the invention.

What is claimed is:

1. A method of laminating a document in a plastic film comprising the steps of providing a device having first and second electrically nonconductive members with planar surfaces with one of said surfaces having a platen thereon which is comprised of a pad of material which converts microwave energy to heat energy and the other of said surfaces has an elastomeric pad thereon, using a laminating pouch comprising a plastic film having a heat activated adhesive coating thereon, placing a document in said pouch, placing said pouch with said document therein between said first and second members, clamping said members so as to exert pressure on said pouch and document, placing said clamped members in a microwave oven and operating said oven for a period of time to have said platen heat to a temperature sufficient to fuse the adhesive resin of the laminating pouch to the document.

2. The method of claim 1 including the further step of removing the said non-conductive members from the oven, allowing a time for said platen pad to cool, removing the laminated material and trimming the material of the laminating pouch.

3. The method of claim 1 wherein the platen pad is selected to be of a hardness which will compress said elastomeric pad when said first and second members are clamped.

4. The method of claim 3 wherein said platen pad will cause said elastomeric pad to bottom when said elastomeric pad is compressed.

* * * * *